US006943808B2

(12) United States Patent
Hains et al.

(10) Patent No.: US 6,943,808 B2
(45) Date of Patent: Sep. 13, 2005

(54) SYSTEM AND METHOD OF REDUCING ALIASING IN PRINTED IMAGES

(75) Inventors: Charles M. Hains, Altadena, CA (US); Sang-Chul Kang, Irvine, CA (US)

(73) Assignee: Xerox Corporation, Stamford, CT (US)

( * ) Notice: Subject to any disclaimer, the term of this patent is extended or adjusted under 35 U.S.C. 154(b) by 189 days.

(21) Appl. No.: 10/320,841

(22) Filed: Dec. 16, 2002

(65) Prior Publication Data

US 2004/0113921 A1 Jun. 17, 2004

(51) Int. Cl.[7] .............................. G09G 5/00; G06K 9/40; G06K 15/00; G06K 9/32
(52) U.S. Cl. ........................ 345/611; 345/596; 345/618; 345/656; 345/657; 345/658; 358/1.1; 358/3.17; 358/3.3; 358/534; 358/536; 382/260; 382/266; 382/269; 382/296
(58) Field of Search ................................. 345/596, 606, 345/611, 616–618, 426–428, 631, 649, 657–659, 64; 358/1.1–1.9, 3.14–3.3, 534–536; 382/260–269, 274–276, 282, 289, 254, 293–297

(56) References Cited

U.S. PATENT DOCUMENTS

| | | | | |
|---|---|---|---|---|
| 5,432,898 A | | 7/1995 | Curb et al. ................. | 395/143 |
| 5,438,656 A | | 8/1995 | Valdés et al. ............... | 395/143 |
| 5,991,513 A | * | 11/1999 | Levien ....................... | 358/3.26 |
| 6,144,461 A | * | 11/2000 | Crean et al. ................ | 358/1.9 |
| 2003/0133161 A1 | * | 7/2003 | Harrington ................ | 358/3.06 |

OTHER PUBLICATIONS

Dimitri Van Deville, Wilfried Philips, Ignace Lemahieu, "Suppressing sampling moiré by least–squares prefiltering in color printing", Final Programme and Proceedings; First European Conference on Colour in Graphics, Image and Vision, Poitiers, France, Apr. 2–5, 2002, pp. 100–103.

Joseph Shu, Tsung Nan Lin, Anoop Bhattacharyja, Tadashi Shiozaki, Adaptive–Hierarchical–Filtering Technique for High–Quality Magazine Image Reproduction, *Human Vision and Electronic Imaging*, Proceedings of the SPIE— International Society for Optical Engineering, 2000, pp. 625–633.

D. Kermisch, P.G. Roetling, "Fourier spectrum of halftone images", Journal of the Optical Society of America, American Institute of Physics, New York, vol. 65, No. 6, Jun. 1975, pp. 716–723.

Franklin C. Crow, "A Comparison of Antialiasing Techniques", IEEE Computer Graphics and Applications, New York, vol. 1, No. 1, Jan. 1981, pp. 40–48.

Paul A. Delabastita, "Recent Trends in digital halftoning", Proceedings of the SPIE, Bellingham, Virginia, vol. 2949, Oct. 7, 1996, pp. 318–331.

Paul G. Roetling, "Halftone method with edge enhancement and Moiré suppression", Journal of the Optical Society of America, vol. 66, No. 10, Oct. 1976, pp. 985–989.

* cited by examiner

*Primary Examiner*—Matthew C. Bella
*Assistant Examiner*—Wesner Sajous
(74) *Attorney, Agent, or Firm*—Jeanette M Walde

(57) ABSTRACT

The system and method reduces aliasing which is formed by the patterns that are introduced by the halftone screens used in the printer. The system and method provides halftone-specific anti-alias filters for obtaining optimal effective resolution in printed images. A method of reducing aliasing in a digital image includes providing a digital image; selecting a halftone screen for halftoning the digital image, wherein the halftone screen has a directional component associated with it; filtering the digital image with an anti-aliasing filter, the antialiasing filter having been designed to have a directional frequency response that is optimized for the directional component of the selected halftone screen; and halftoning the filtered digital image.

12 Claims, 6 Drawing Sheets

(2 of 6 Drawing Sheet(s) Filed in Color)

SYSTEM AND METHOD OF REDUCING ALIASING IN PRINTED IMAGES

FIELD OF THE INVENTION

This invention relates generally to digital imaging systems, and more particularly to a method of filtering digital images to reduce aliasing in the halftoning process.

BACKGROUND OF THE INVENTION

When digital images are resampled, screened and finally printed on a printing device utilizing halftones, jagged edges and subject-moiré are sometimes introduced in the printed image. The introduction of jaggies and subject-moiré occurs when the image contains frequency patterns which are near to, or higher than, the frequency of one of the halftone screens of the printing device. This phenomenon is generally known as aliasing.

Antialiasing in the context of digitizing line art and certain graphical image structures is a method of using intermediate levels of intensity to achieve subpixel position of edges for several reasons including reduction or elimination of jaggies on the edges of lines and polygons, including text. Antialiased refers to those segments or regions of an image that are effected by an antialiasing operation applied to the image (e.g., an image processing operation or a physical process resulting in gray pixels along the edges of line art or text). Jaggies are primarily visible at the edges of sloped lines approaching horizontal or vertical.

A number of patents and publications have disclosed information relevant to antialiasing. For example, "A Comparison of Antialiasing Techniques," IEEE CG&A, Vol. 1, No. 1, Jan. 1981, pp. 40–48, F. Crow suggests that prefiltering is a computationally effective technique for antialiasing. U.S. Pat. No. 5,432,898 to Curb et al, issued Jul. 11, 1995, describes a system and method for anti-aliasing of lines within a data processing system having graphics capability. U.S. Pat. No. 5,438,656 to Valdes, et al., issued Aug. 1, 1995, describes a method of synthesizing multi-level raster shapes directly from ideal shapes. U.S. Pat. No. 6,144,461 to Crean, et al., issued Nov. 7, 2000, describes a method for antialiased tagging (AAT) applied coincident with an antialiasing operation, in which a different filter is used for each image content type (e.g., text, graphics).

A common method for reducing aliasing is to apply a low pass filter (an anti-aliasing filter) to the original image before it is being resampled, or another low-pass filter prior to halftoning. The problem with applying either low-pass filter is that low-pass filters reduce effective resolution. Jaggies as well as subject-moire patterns are generally most severe when the image content is aligned with one of the two axial directions of a halftone screen. This is particularly true in the case of line screens, where there is only one axial direction. Low-pass filtering of an image prior to halftoning lowers the effective resolution and quality of an image isotropically, when it may not have been necessary since the resulting interference patterns are highly directional. It would be desirable to have an optimal filter such that the jagged edges and visual artifacts disappear, while blurring the image as little as possible.

SUMMARY OF THE INVENTION

The system and method of the invention reduces aliasing which is formed by the patterns that are introduced by the halftone screens used in the printer. The system and method of the invention provides halftone-specific anti-alias filters for obtaining optimal effective resolution in printed images. A method of reducing aliasing in a digital image, according to one aspect of the invention, includes providing a digital image; selecting a halftone screen for halftoning the digital image, wherein the halftone screen has a directional component associated with it; filtering the digital image with an antialiasing filter, the antialiasing filter having been designed to have a directional frequency response that is optimized for the directional component of the selected halftone screen; and halftoning the filtered digital image.

A system for processing digital document images having reduced aliasing in digital images, according to another aspect of the invention, includes an image source for providing a digital image; a controller for selecting a halftone screen for halftoning the digital image, wherein the halftone screen has a directional component associated with it; an antialiasing filter for filtering the digital image prior to halftoning, the antialiasing filter having been designed to have a directional frequency response that is optimized for the directional component of the selected halftone screen; and a halftone module for halftoning the filtered digital image.

The antialiasing filter is optimized for the specific halftone screen chosen to halftone the digital image. An antialiasing filter can be designed for any halftone screen having a directional component (angle) associated with it. For example, in the case of a line screen, which is defined by a frequency and screen angle, the antialiasing filter is an elliptical filter oriented substantially in the direction perpendicular to the defined screen angle. In the case of a clustered dot halftone screen having orthogonal dots and a defined screen angle, the antialiasing filter is a four lobed structure formed by two ellipses superimposed and rotated ninety degrees apart, one of the ellipses of the four lobed structure being oriented substantially in the direction perpendicular to the defined screen angle. In the case of a clustered dot halftone screen having non-orthogonal dots and two defined screen angles, the antialiasing filter is a four lobed structure formed by two ellipses superimposed and rotated a fixed angle not ninety degrees apart, each of the ellipses of the four lobed structure being oriented substantially in the direction perpendicular to the defined screen angles.

BRIEF DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION OF THE EMBODIMENTS

While printing a radial-varying frequency pattern test chart on the DocuColor 60 printer and on the iGen3 printer (both manufactured by Xerox Corporation), it can be seen that a small circular interference pattern appears when the varying pattern is parallel to the halftone screen pattern and at a related frequency. For iGen3 which uses rotated clustered dot halftone screens, each screen produces four patterns separated by 90 degrees and rotated to the angle of the screen. For example the 18° magenta screen produces patterns at 18°, 108°, −72°, and −162°. For the DocuColor60 which uses line screens, each screen produces only two patterns separated by 180 degrees and aligned perpendicular to the screen direction.

In the case of the line screen, the interference pattern is very localized in both frequency as well as direction. In other directions, and especially along the line screen direction, the halftone can reproduce detail far beyond the halftone frequency. The limiting frequency is that of the printer pixels themselves, which is 600 spots per inch. In order to eliminate the directional interference pattern, the image was passed through a low-pass filter prior to halftoning, which eliminated all frequencies near or higher than the screen frequency of 171 lpi. This resulted in an overall loss of image sharpness and quality when it was only necessary to remove the frequencies with alignments that interfere with the halftone screen.

The system and method of the invention reduces the problems of jagged edges and loss of sharpness in resampled and screened and printed images. For each separation, a unique directional filter may be designed with directional frequency response that is optimized for the particular angle and frequency of the halftone screen used for that separation. Each filter would aggressively blur the image detail that would have interacted with the screen, while minimally blurring the image detail that would not have interacted. Thus, in each separation, unnecessary reduction in image sharpness can be avoided. And, when the image is blurred in one direction for one separation, the apparent visual sharpness may be carried by the less-disturbed detail in one of the other separations.

A filter may be designed which is optimized for any halftone screen which has a directional component associated with it. While each of the DocuColor60 line screens has only two interference patterns along one axial direction, the iGen3 cluster dots have four patterns in two axial directions. In the case of a cluster dot screen,, the filters can be optimized in those two axial directions and relaxed in the other directions.

Figure 1:
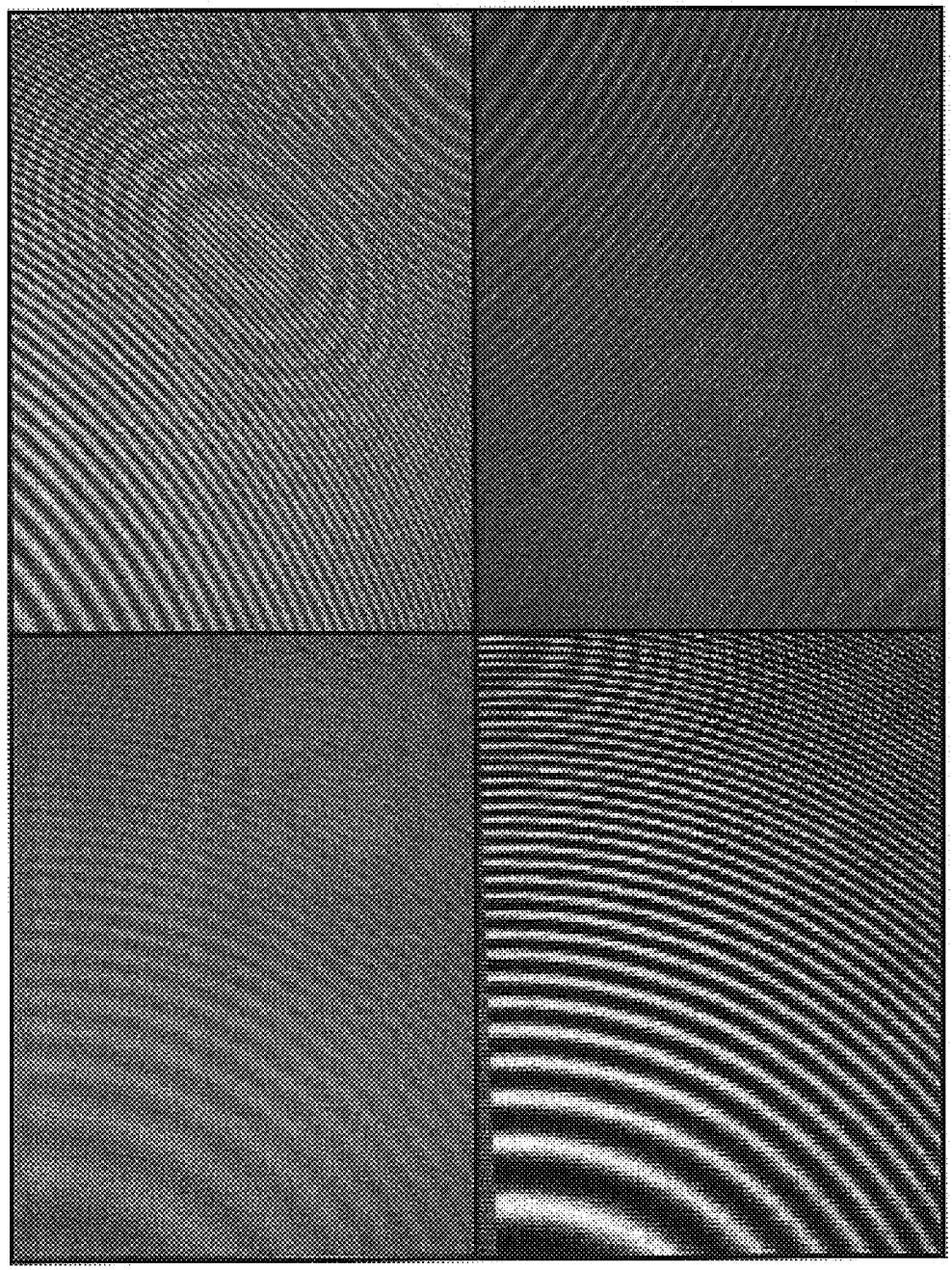
FIG. 1 illustrates four unfiltered CMYK images showing interference pattern interactions with four halftone screens.

In FIG. 1, four unfiltered images (cyan, magenta, yellow and black) which were halftoned using a line screen from a DocuColor60 printer illustrate how the frequency content increases diagonally from the lower left of the circular images for cyan, yellow and black, and diagonally from the lower left for the magenta image. The depth of modulation decreases clockwise from the vertical. The small circular interference patterns appear strongest at a different angular position and frequency radius for each separation. Referring to FIG. 1, interference patterns are strongest in the upper right quadrant and center of the cyan image, the lower right quadrant of the magenta image, the upper right quadrant of the yellow image and the upper left quadrant of the black image where the modulation is strongest. The small patterns appear where the varying frequency pattern is parallel to the halftone screen pattern, and at a related frequency.

The Docucolor60 printer uses line screens, so each screen produces only two patterns separated by 180 degrees and aligned perpendicular to the screen direction. The Cyan screen is a rotated line screen at an angle of −45°, so the interference pattern appears at +45° near the top right corner. The Magenta screen is at an angle of +45°, so the pattern appears at −45° in the lower right corner (less apparent because of the decreasing contrast). The Yellow screen is at an angle of −36.6°, so the pattern appears at 63.4° in the upper right quadrant. The Black screen is a horizontal line screen, so the interference pattern appears at the top. FIG. 1 demonstrates that there is very little interaction with the halftone screens at angles other than the screen angle and at even higher frequencies.

Figure 2:
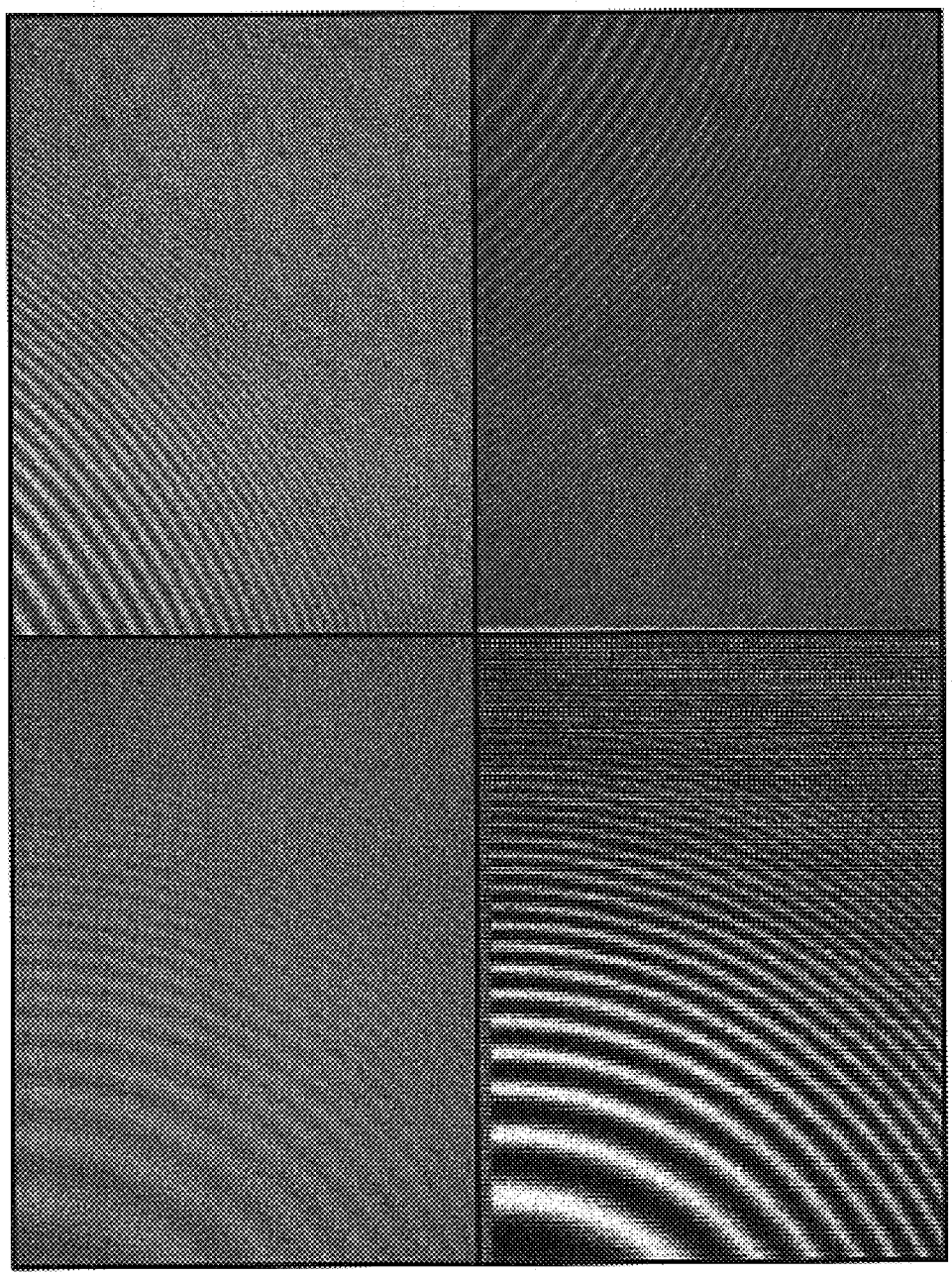
FIG. 2 illustrates the same four images after being processed with antialiasing filters according to the invention.

The images in FIG. 2 were processed with elliptical low-pass filters which are aligned with the screen directions. The directional filters effectively blur the images in the cross-screen direction, removing the interference patterns while leaving image detail in the screen direction with full resolution.

The system and method of the invention can be used to reduce the effects of aliasing caused by any type of halftone screen having a directional component. For each selected halftone screen, a unique antialiasing filter can be optimized. Optimization involves matching the filter characteristics with the directional characteristics of the selected screen.

Figure 3:
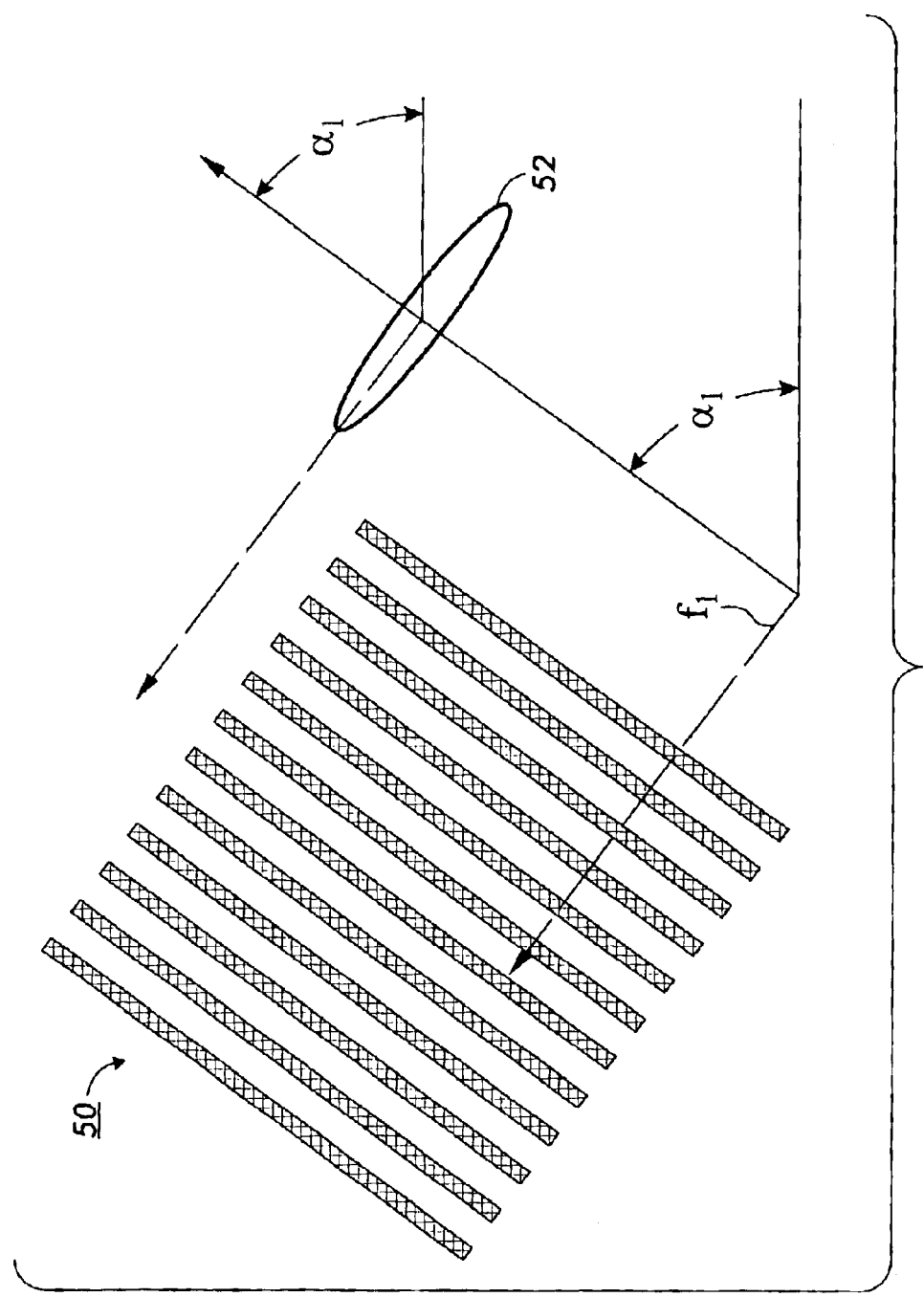
FIG. 3 is an exemplary antialiasing filter which has been optimized for a halftone line screen.

An exemplary antialiasing filter 52 which has been designed to compensate for a line screen 50 having a frequency $f_1$ and angle $\alpha_1$ is shown in FIG. 3. A line screen is exactly defined by its frequency and angle. Given the line screen frequency $f_1$, first design a radially symmetric circular filter for frequency $f_1$ (this reduces possible interference in all directions). Use the screen angle $\alpha_1$ to make the filter elliptical oriented in the direction perpendicular to the screen angle (this reduces two interference patterns in one axial direction). The resulting antialiasing filter 52 is elliptical with its long axis rotated 90° away from $\alpha_1$. The ellipse in FIG. 3 is a schematic representation of the amplitude of the numerical values in a rectangular filter array. The filter response in the frequency domain appears to be rotated 90 degrees with respect to this spatial representation.

Figure 4:
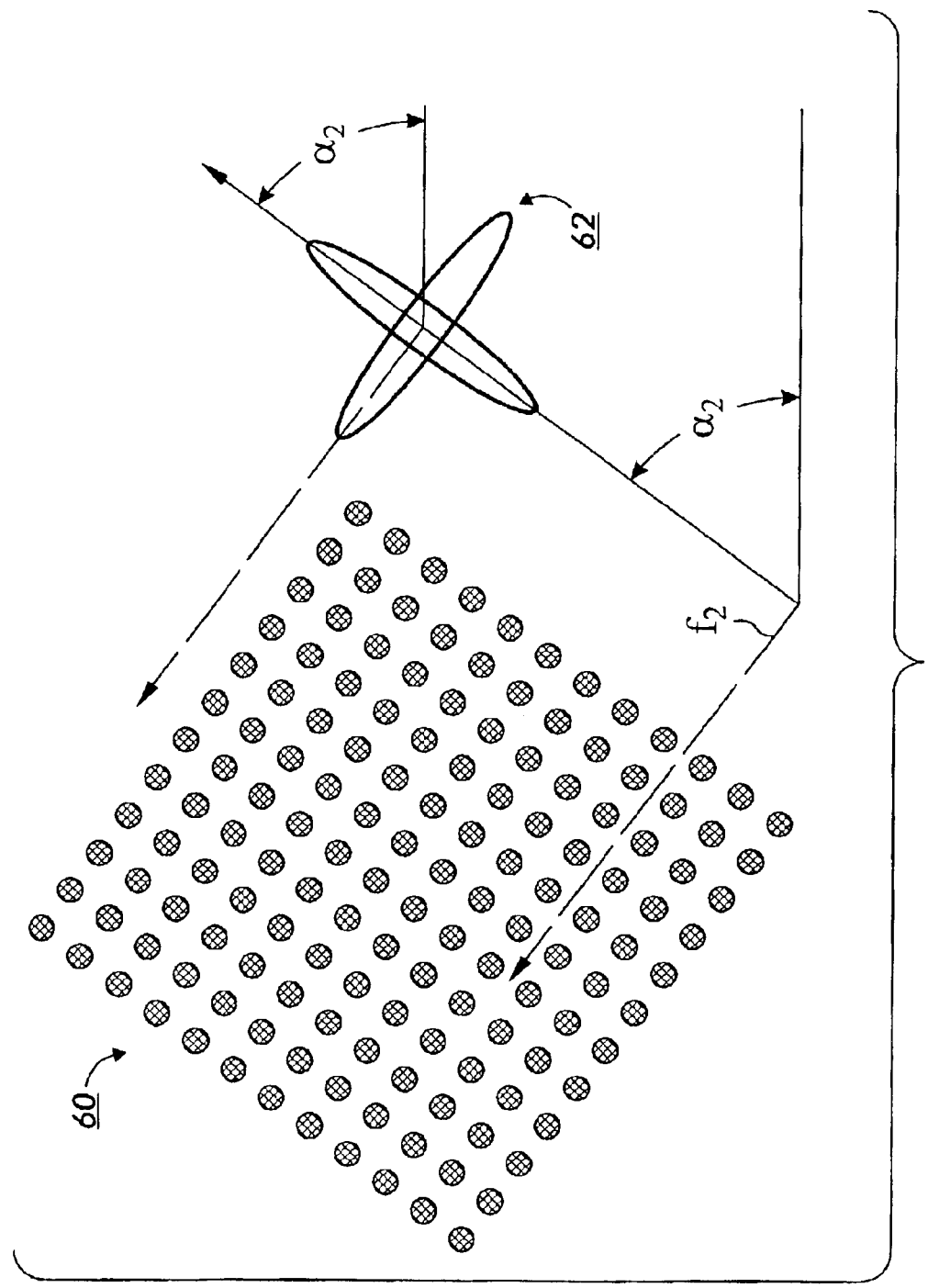
FIG. 4 is an exemplary antialiasing filter which has been optimized for a clustered dot halftone screen having orthogonal dots.

An exemplary antialiasing filter 62 which has been designed to compensate for a clustered dot screen 60 having orthogonal dots is shown in FIG. 4. A clustered dot halftone screen with orthogonal dots is exactly defined by its screen frequency $f_2$ and directional component $\alpha_2$. Given the screen frequency, a radially symmetric circular filter of frequency $f_2$ is designed. The circular filter is then skewed into an ellipse in the direction of the screen angle $\alpha_2$, and a copy is then skewed into an ellipse in the direction perpendicular to the screen angle $\alpha_2$. The two ellipses are then superimposed producing a four-lobed filter.

Figure 5:
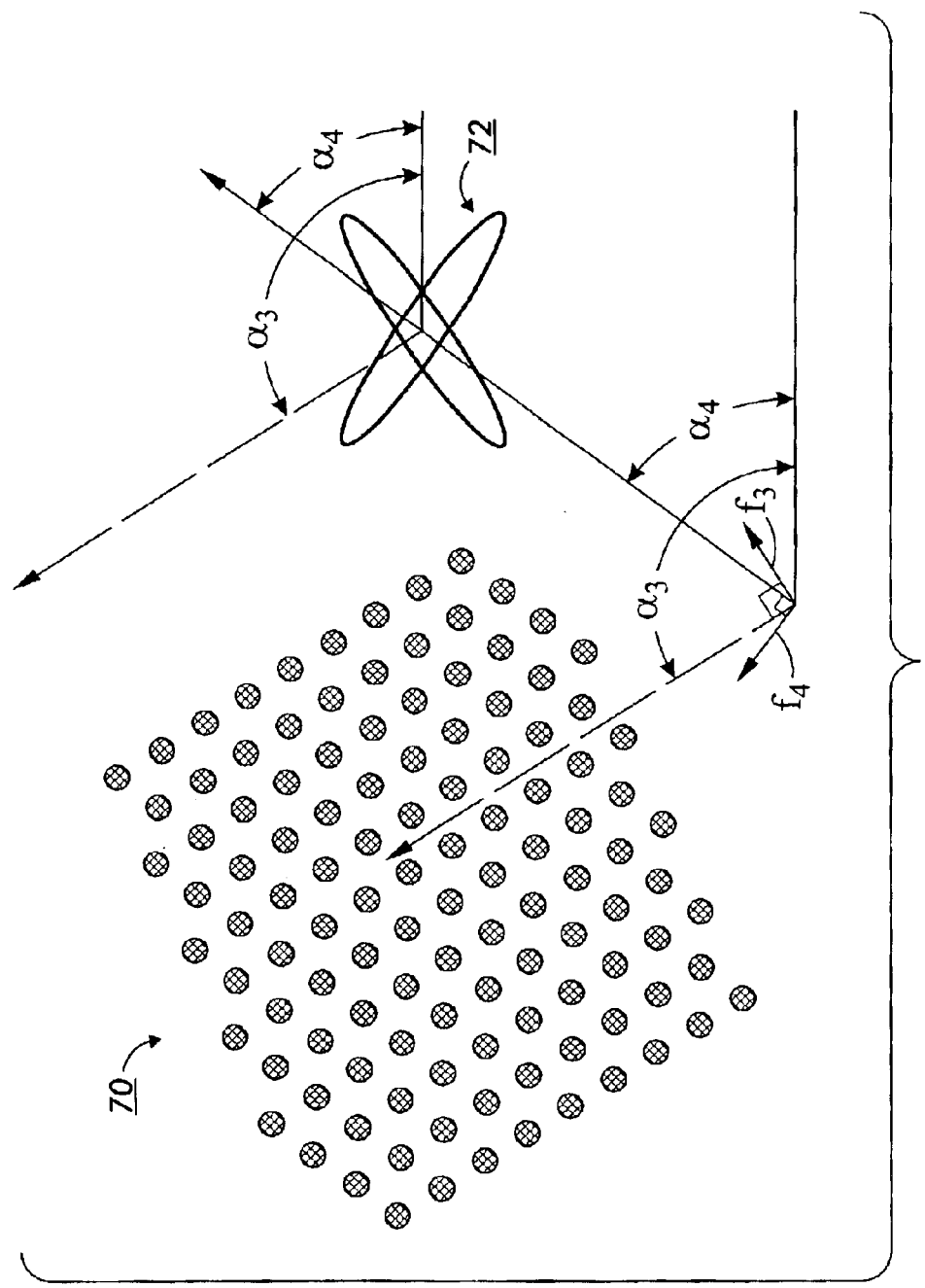
FIG. 5 is an exemplary antialiasing filter which has been optimized for a clustered dot halftone screen having non-orthogonal dots.

An exemplary antialiasing filter 72 which has been designed to compensate for a clustered dot screen 70 having non-orthogonal dots is shown in FIG. 5. A clustered dot halftone screen with non-orthogonal dots is exactly defined by its two screen frequencies $f_3$ and $f_4$, and directional components $\alpha_3$ and $\alpha_4$. Given the screen frequencies, two radially symmetric circular filters of frequencies $f_3$ and $f_4$, are designed. Each circular filter is then skewed into an ellipse in the direction perpendicular to the corresponding screen angle $\alpha_3$ and $\alpha_4$. The two ellipses are then superimposed producing a four-lobed filter.

To the extent that a stochastic halftone screen, a diffuse halftone screen or an error diffusion halftone screen contains a directional effect, a unique antialiasing filter may be designed to compensate for the directional effect. In addition to providing an antialiasing filter which compensates for the directional effect of a halftone screen, an antialiasing filter can be designed which includes a small effect to compensate for high addressability in one direction. Additionally, an antialiasing filter may be designed which compensates for a small second order effect in both the horizontal and vertical directions, which may compensate for the horizontal and vertical bias of a raster scanning system, or the bias of the human visual system sensitivity to horizontal and vertical patterns.

Each designed filter is substantially aligned with its halftone screen. The antialiasing filter designed for each halftone screen is defined by frequency and direction and favors a selected direction. In a printing system, the antialiasing filter would be selected on the fly, depending on the halftone filter selected for the particular image to be printed.

Figure 6:
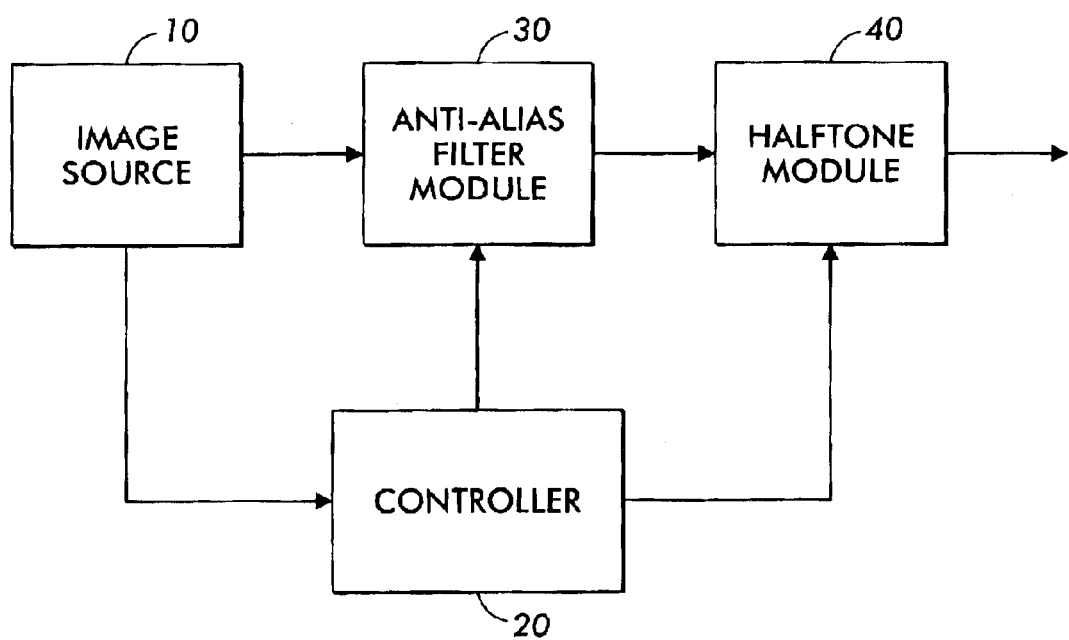
FIG. 6 is a block diagram of a system for processing digital document images having reduced aliasing.

A system for processing digital document images having reduced aliasing is shown in FIG. 6. An image source 10, which may be a scanner or copier, produces a scanned digital image. Responsive to the scanned digital image, controller 20 determines the appropriate halftone screen for use with the scanned image. For a CMYK scanned image, the controller will select a separate halftone screen for each color separation. Based on the type of halftone screen selected for the scanned image, an optimized antialiasing filter is selected. The scanned digital image is then filtered by the antialiasing filter module 30 before it is halftoned in the halftone module 40.

The system and method of filtering digital images to reduce aliasing in halftone areas applies a separate low-pass filter to each color separation, with the filter tuned to the directional orientation of the halftone screen being applied. In the one embodiment, the printed separations are low-pass filtered with elliptical (or other anisotropic) low-pass filters specially designed for each separation to eliminate high frequencies in the direction aligned with the halftone screen for the separation. Since detail is removed from only the separation that would interfere with the corresponding screen and is preserved in other separations, the technique produces sharper images than those obtained with a single low-pass filter for all separations. The system and method provide noticeable image quality improvement and is applicable to any color marking product using halftones.

The invention has been described with reference to particular embodiments for convenience only. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A method of reducing aliasing in a digital image, comprising:

provding a digital image;

for each separation, selecting a halftone screen for halftoning the digital image, wherein the halftone screen has a directional component associated with it;

filtering the digital image with an antialiasing filter, the antialiasing filter having been designed to have a directional frequency response that is optimized for the directional component of the selected halftone screen, such that the antialiasing filter would aggressively blur the image detail that would have interacted with the halftone screen, while minimally blurring the image detail that would not have interacted, wherein when the image is blurred in one direction for one separation, the apparent visual sharpness may be carried by the less-disturbed detail in one of the other separations; and halftoning the filtered digital image.

2. A method of reducing aliasing in a digital image, comprising:

providing a digital image;

selecting a halftone screen for halftoning the digital image, wherein the halftone screen has a directional component associated with it;

filtering the digital image with an antialiasing filter, the antialiasing filter have been designed to have a directional frequency response that is optimized for the directional component of the selected halftone screen;

halftoning the filtered digital image;

wherein the halftone screen comprises a line screen having a defined screen angle; and wherein the antialiasing filter comprises an elliptical filter oriented substantially in the direction perpendicular to the defined screen angle.

3. A method of reducing aliasing in a digital image, comprising:

providing a digital image;

selecting a halftone screen for halftoning the digital image, wherein the halftone screen has a directional component associated with it;

filtering the digital image with an antialiasing filter, the antialiasing filter having been designed to have a directional frequency response that is optimized for the directional component of the selected halftone screen;

halftoning the filtered digital image;

wherein the halftone screen comprises a clustered dot screen having orthogonal dots and a defined screen angle; and wherein the antialiasing filter comprises a four lobed structure formed by two ellipses superimposed and rotated ninety degrees apart, one of the ellipses of the four lobed structure being oriented substantially in the direction perpendicular to the defined screen angle.

4. A method of reducing phasing in a digital image comprising:

providing a digital image;

selecting a halftone screen for halftoning the digital image, wherein the halftone screen has a directional component associated with it;

filtering the digital image with an antialiasing filter, the antialiasing filter having been designed to have a directional frequency response that is optimized for the directional component of the selected halftone screen;

halftoning the filtered digital image;

wherein the halftone screen comprises a clustered dot screen having non-orthogonal dots and two defined screen angles; and wherein the antialiasing filter comprises a four lobed structure formed by two ellipses superimposed, each of the two ellipses of the four lobed structure being oriented substantially in the direction perpendicular to one of the defined screen angles.

5. The method of claim 1, wherein the antialiasing filter further comprises a small effect to compensate for high addressability in one direction.

6. The method of claim 1, wherein the antialiasing filter further comprises a small second order effect to compensate for directionality effects in the horizontal and vertical directions.

7. A system for processing digital document images having reduced aliasing in digital images; comprising:

an image source for providing a digital image;

a controller for selecting, for each separation, a halftone screen for halftoning the digital image, wherein the halftone screen has a directional component associated with it;

an antialiasing filter for filtering the digital image prior to halftoning, the antialiasing filter having been designed to have a directional frequency response that is optimized for the directional component of the selected halftone screen, such that the antialiasing filter would aggressively blur the image detail that would have interacted with the halftone screen, while minimally blurring the image detail that would not have interacted, wherein when the image is blurred in one direction for one separation, the apparent visual sharpness may be carried by the less-disturbed detail in one of the other separations; and a halftone module for halftoning the filtered digital image.

8. A system for processing digital document images having reduced aliasing in digital images; comprising:

an image source for providing a digital image;

a controller for selecting a halftone screen for halftoning the digital image, wherein the halftone screen has a directional component associated with it:

an antialiasing filter for filtering the digital image prior to halftoning, the antialiasing filter having been designed to have a directional frequency response that is optimized for the directional component of the selected halftone screen;

a halftone module for halftoning the filtered digital image;

wherein the halftone screen comprises a line screen having a defined screen angle; and wherein the antialiasing filter comprises an elliptical filter oriented substantially in the direction perpendicular to the defined screen angle.

9. A system for processing digital document images having reduced aliasing in digital images; comprising:

an image source for providing a digital image;

a controller for selecting a halftone screen for halftoning the digital image, wherein the halftone screen has a directional component associated with it;

an antialiasing filter for filtering the digital image prior to halftoning, the antialiasing filter having been designed to have a directional frequency response that is optimized for the directional component of the selected halftone screen;

a halftone module for halftoning the filtered digital image;

wherein the halftone screen comprises a clustered dot screen having orthogonal dots and a defined screen angle; and wherein the antialiasing filter comprises a four lobed structure formed by two ellipses superimposed and rotated ninety degrees apart, one of the ellipses of the four lobed structure being oriented substantially in the direction of the defined screen angle.

10. A system for processing digital document images having reduced aliasing in digital images; comprising:

an image source for providing a digital image;

a controller for selecting a halftone screen for halftoning the digital image, wherein the halftone screen has a directional component associated with it;

an antialiasing filter for filtering the digital image prior to halftoning, the antialiasing filter having been designed to have a directional frequency response that is optimized for the directional component of the selected halftone screen;

a halftone module for halftoning the filtered digital image;

wherein the halftone screen comprises a clustered dot screen having non-orthogonal dots and two defined screen angles; and wherein the antialiasing filter comprises a four lobed structure formed by two ellipses superimposed, each of the two ellipses of the four lobed structure being oriented substantially in the direction perpendicular to one of the defined screen angles.

11. The system of claim 7, wherein the antialiasing filter further comprises a small effect to compensate for high addressability in one direction.

12. The system of claim 7, wherein the antialiasing filter further comprises a small second order effect to compensate for directionality effects in the horizontal and vertical directions.

* * * * *